United States Patent [19]
Maurer et al.

[11] Patent Number: 5,645,149
[45] Date of Patent: Jul. 8, 1997

[54] FREEWHEEL-RETAINER RING WITH CENTRIFUGAL FORCE TAKEOFF

[75] Inventors: Ruprecht Maurer; Karlheinz Timtner, both of Bad Homburg; Siegfried Jackwerth, Friedrichsdorf, all of Germany

[73] Assignee: Ringspann GmbH, Bad Homburg, Germany

[21] Appl. No.: 565,802

[22] Filed: Nov. 30, 1995

[30] Foreign Application Priority Data

Dec. 9, 1994 [DE] Germany ............... 44 43 723.4

[51] Int. Cl.$^6$ .................................. F16D 41/07
[52] U.S. Cl. ........................ 192/45.1; 192/104 C
[58] Field of Search ...................... 192/45.1, 104 C

[56] References Cited

U.S. PATENT DOCUMENTS

| | | | |
|---|---|---|---|
| 2,609,904 | 9/1952 | Swenson et al. | 192/45.1 |
| 3,543,894 | 12/1970 | Giese | 192/45.1 |
| 3,702,649 | 11/1972 | Giese et al. | 192/45.1 X |
| 4,522,289 | 6/1985 | Giese | 192/41 A |

FOREIGN PATENT DOCUMENTS

| | | |
|---|---|---|
| 2 267 484 | 11/1975 | France . |
| 2 004 457 | 8/1972 | Germany . |
| 74 37 065 | 6/1975 | Germany . |
| 31 51 727 A1 | 7/1983 | Germany . |
| 32 41 245 A1 | 5/1984 | Germany . |
| 32 41 246 A1 | 5/1984 | Germany . |

*Primary Examiner*—Rodney H. Bonck
*Attorney, Agent, or Firm*—Panitch Schwarze Jacobs & Nadel, P.C.

[57] ABSTRACT

A freewheel retainer ring with centrifugal force takeoff has two ring-shaped edge rings which are connected with each other by several axial connecting bolts and which mount clamping members between them. For this purpose, separate pockets are arranged respectively at both end faces of the clamping members. The pockets at least guide the clamping member in the circumferential direction, whereby one pocket is connected with one edge ring, and the other pocket is connected with the opposite edge ring.

19 Claims, 3 Drawing Sheets

FREEWHEEL-RETAINER RING WITH CENTRIFUGAL FORCE TAKEOFF

FIELD OF THE INVENTION

The invention concerns a freewheel-retainer ring consisting of two ring-shaped, essentially radially-extending edge rings, connected with each other by several axial connecting bolts with formation of an axial interspace, and between which a number of clamping members (sprags) are pivotably mounted in the retainer ring and pretensioned by at least one spring in the direction of engagement, whereby under the influence of centrifugal force the clamping members execute a swiveling motion, acting in the direction of disengagement, against the spring bias.

BACKGROUND OF THE INVENTION

With freewheels of this type it is known that, during idling, the retainer ring revolves together with the freewheel outer ring, while the freewheel inner ring stands still. The clamping members are thereby pressed outward by the centrifugal force acting upon them, swung in the disengaging direction and thereby lifted off from the freewheel inside ring. The clamping member center of gravity in relation to the clamping member axis of rotation is thereby so displaced in the circumferential direction that the center of gravity moves outward upon pivoting in the disengagement direction. Since the retainer ring rotates synchronously with the freewheel outer ring, any abrasion during idling is eliminated as soon as the number of revolutions required for the centrifugal force takeoff is exceeded. This has considerable significance because even minor material wear and tear on the clamping member can lead to malfunctions as a consequence of uneven engagement, and finally to a breakdown of the freewheel with dangerous consequences for the maintenance personnel.

Allowing the clamping member to takeoff from the outer ring instead of the inner ring, while idling, is known from DE-A 20 04 457, from which the present invention proceeds. This alternative is required when the freewheel inner ring rotates in idling operation while the outer ring stands still. For this, the center of gravity of the clamping member must be shifted toward the clamping member tilt axis, such that the swinging movement in the disengaging direction leads to a takeoff of the clamping member from the freewheel outer ring. Since the bracing of the clamping members against the action of centrifugal force in this case can no longer take place by the outer ring, they are braced in the known case against a concentric prop ring, which stands in friction-locking contact with the freewheel inner ring. This prop ring can also consist of inwardly jutting bends of the two edge rings of the retainer ring.

A disadvantage with this known construction is the fact that the clamping members are not guided in the circumferential direction. They can thereby bump into one another and mutually disturb each other in their tilting movement. This can lead to an uneven grip of individual clamping members upon engaging, especially in sudden torque thrusts, possibly upon starting up from idling, from which undesirable locally high stresses result which endanger the function of the freewheel.

For eliminating these disadvantages, it has become known from DE-A 31 51 727 to guide the clamping members in the circumferential direction by mounting each of them in a clamp. Each clamp has stamped-on flaps on both axial ends, which project into corresponding openings of the edge rings and bend over behind these. In this way, the clamps hold not only the clamping members but also the two edge rings of the retainer ring.

The advantage resulting from this solution, of being able to cover varying freewheel diameters with clamping members and clamps remaining the same and only having to adapt the edge rings to the respective diameter, is, however, bought at the price of a relatively high manufacturing expense.

SUMMARY OF THE INVENTION

Proceeding from this, an object of the present invention lies in improving the known freewheel retainer rings described at the outset, such that they can be manufactured more cheaply. At the same time, they should distinguish themselves by the highest torque transmission and the simplest adaptability to various overall widths.

These objects are solved in accordance with the invention by two separate pockets being allocated to each clamping member in its axial extension, the pockets engaging opposite end faces of the clamping member and guiding it at least in the circumferential direction, the one pocket being connected with the one edge ring, the other being connected with the opposite edge ring.

From this results the advantage that the form of the pockets no longer depends upon the width of the freewheel, as for example in DE-A 31 51 727. They can instead remain the same with a given clamping member height for any desired freewheel widths and freewheel diameters. Since the clamping members can therefore only vary in their length, there results as a particular economic advantage that parts with complicated profiling, i.e., pockets and clamping members, are always the same, so that production in great numbers can be conducted extremely rationally. The edge rings, of varying sizes, which are required in comparatively small numbers, are on the other hand, simple turned pieces, which are only provided with some bores for connecting bolts. Above and beyond this, the functions of connecting the edge rings, on the one hand, and guiding the clamping members, on the other, are separated so that the pockets can be optimally adapted to the requirements of guiding the clamping members.

In the interest of an exact positioning of the pockets on the edge rings, it is recommended that the latter have stop faces, especially a hollow cylindrical circular stop face, on which the pockets are braced at least in a radial direction. For this purpose, it is especially suitable if two opposite stop faces are produced by a ring-shaped axial groove running in the circumferential direction in each edge ring, and the radial breadth of this groove is adapted to the radial extension of the pockets. The pockets then need merely be installed in the axial groove mentioned above and are thereby automatically held in the right position radially inside as well as radially outside. The latter can also be supported by the pockets having two or three contact points radially inside and/or outside, which ensure the precise fitting radial position of the pockets in the edge rings.

It is especially suitable if the clamping members on this stop face are also braced by outwardly tip-stretched shoulders on their end faces. In this case, the hollow cylindrical stop face must project so far inwardly that the bracing of the clamping members can be assumed on the shoulders mentioned above.

It obviously also lies within the scope of the invention to provide the radial bracing of the clamping member not on the edge rings, but on the pockets themselves by providing appropriate bracing surfaces there.

Various possibilities offer themselves for the form of the pockets. According to a first alternative, the pockets can consist of a pocket bottom arranged on the end face of the clamping member and of at least one axially protruding guide member, whereby this guiding member braces the clamping member front and back in the circumferential direction of the retainer ring, and when necessary also braces the guiding member radially outwardly. The axially protruding guiding member can thereby surround the clamping member at its outer periphery in order to bring about the desired bracing. According to another alternative, but with elimination of the pocket bottom, the pockets can consist of only a ring-shaped or partial ring-shaped guiding member which also braces the clamping member front and back in the circumferential direction of the retainer ring and if necessary also radially outwardly. For this purpose, the clamping member can also have mounted on its end faces trunnions which respectively protrude into the ring-shaped or partial ring-shaped guiding member.

The connection of the pockets with their assigned edge rings appropriately takes place only on the insides of the edge rings, and to be sure especially by welding. For this purpose, the edge rings, or preferably the pockets, can be provided in advance with appropriate welding bulges during finishing.

The pockets themselves should be made of metal without cutting, especially of bent sheet metal, from die cast metal, cast in a lost wax process or as a sinter part. Each pocket can thereby have on its end face a recess for receiving the leg spring pretensioned in the direction of engagement. At the same time, another stop face can be arranged on the pocket, on which the one leg of the leg spring is braced while the other leg engages on the clamping member. In order that sufficient space remains for the last-mentioned spring leg, the radially inwardly-lying side wall can protrude axially somewhat further than corresponds to the thickness of the pocket in connection with the axial groove in the edge rings. A narrow slit thereby remains between the clamping member side wall and the pocket for movement of the spring leg. Instead of this, the spring leg could also acquire the necessary free space by means of a recess in the pocket or by a slit on the end face of the clamping member.

BRIEF DESCRIPTION OF THE DRAWINGS

The foregoing summary, as well as the following detailed description of preferred embodiments of the invention, will be better understood when read in conjunction with the appended drawings. For the purpose, of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
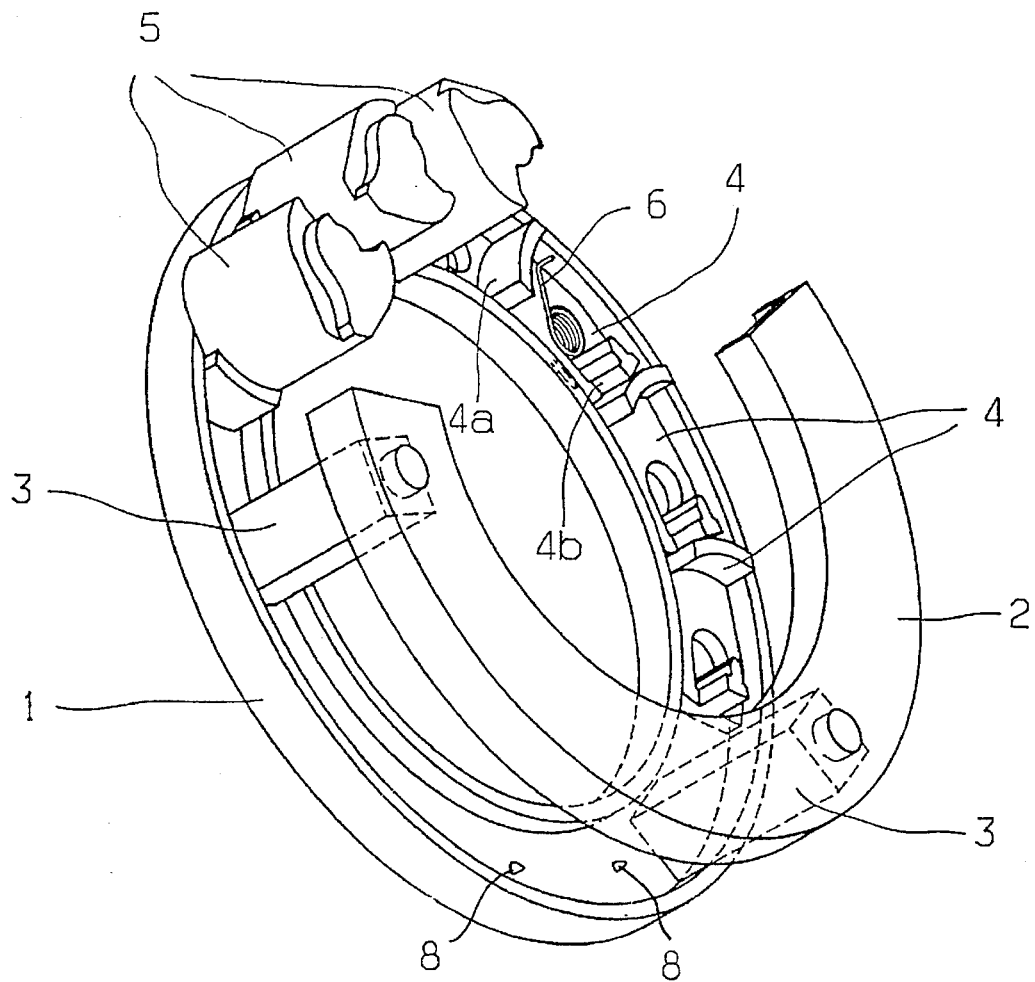
FIG. 1 is an axial interior view of an edge ring of the retainer ring partially equipped with clamping members.
Figure 2:
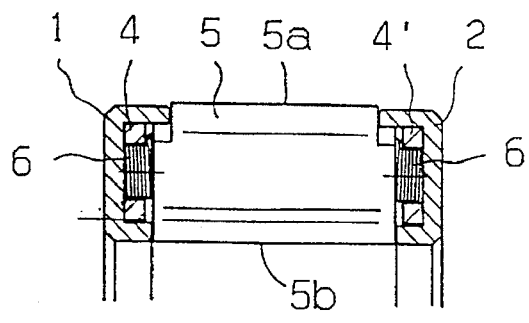
FIG. 2 is an enlarged section along the line II—II in FIG. 1.
Figure 3:
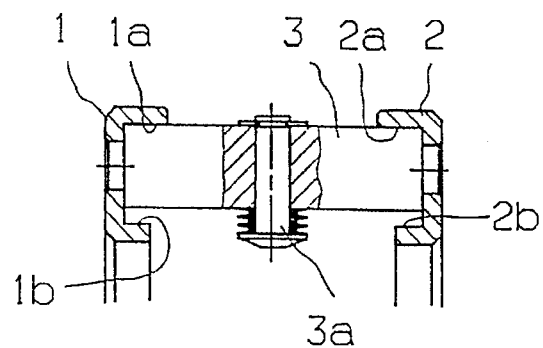
FIG. 3 is an enlarged section along the line III in FIG. 1.

One recognizes first of all on the basis of FIGS. 1 to 3 that the retainer ring comprises two ring-shaped edge rings 1 and 2 which are kept together at a distance by several axially running connecting bolts 3. In FIG. 3, the connecting bolt 3 has a spring-loaded sliding pin 3a which serves to synchronize the retainer ring with a freewheel inner ring, not depicted in greater detail.

The two edge rings 1 and 2 have on their respective sides facing each other case a ring groove, which is limited radially outwardly by a stop face 1a or 2a and limited radially inwardly by a stop face 1b or 2b. In this regard, the radially outward-lying stop faces 1a and 2a extend axially further than the inward-lying stop faces 1b and 2b.

According to FIGS. 1 and 2, both edge rings are equipped between their stop faces 1a, 1b or 2a, 2b with a plurality of pockets 4 or 4' following more or less closely one after another in the circumferential direction. These pockets are respectively so arranged that a clamping member 5 is mounted between a pocket 4 in edge ring 1 and the mirror image pocket 4' lying opposite it in edge ring 2. This clamping member basically has a known form with external clamping surfaces 5a and interior clamping surfaces 5b. It is biased in the direction of engagement by two springs arranged on the end faces, so that its clamping surfaces brace against corresponding companion surfaces of an outer or inner ring, which is not depicted, when inner and outer ring wish to rotate in the direction of engagement, while this bracing is suspended upon rotation in the freewheeling direction.

FIG. 1 depicts in the left upper quadrant three clamping members in various swivelling positions, and in particular beginning from the lower left during full torque transmission; next above to the right in neutral, that is, in the untensioned, standing still position; and finally at the top in a position lifted-off from the outer ring due to centrifugal force acting at a high rate of rotation.

Figure 4:
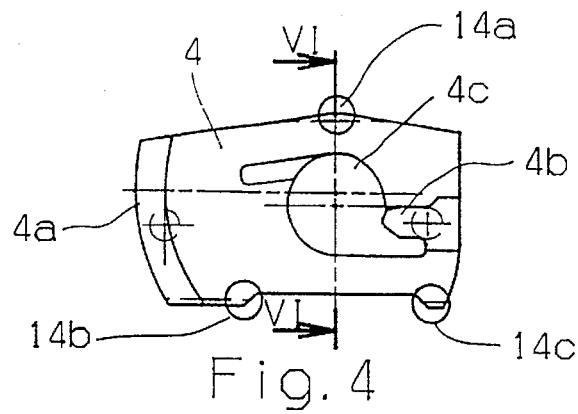
FIG. 4 is an enlarged plan view of a pocket in the axial direction.
Figure 6:
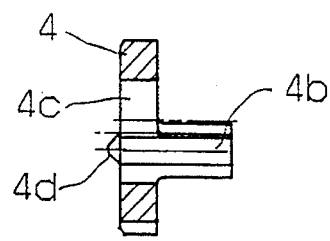
FIG. 6 is a section along line VI—VI in FIG. 4.
Figure 5:
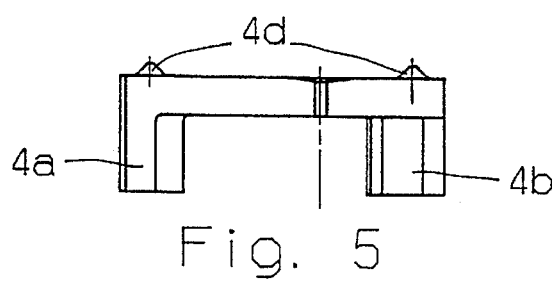
FIG. 5 is the same pocket seen radially from without.

The form of the pockets emerges in detail from FIGS. 4 to 6. The pockets take the form of flat sinter parts which have on one end an axially projecting curved track 4a and at the opposite end an axially protruding guide pin 4b. The parts 4a and 4b are so constructed and positioned that they guide the clamping members in the circumferential direction and thus permit its engaging or disengaging movement. In addition, a bore 4c is provided on the face side for receiving the spring 6 (see FIGS. 1 and 2).

The pockets have inside and outside radially defined positioning zones 14a, 14b and 14c which lie against the stop faces 1a and 1b so that they can be installed in the edge rings with a precise radial fit. The pockets bear several welding bulges 4d on the opposite face side from parts 4a and 4b. These bulges permit welding of the pockets 4 and 4' to the edge ring 1 or 2 in an economical manner. The edge rings, 1, 2 may also be provided with welding bulges 8, is shown in FIG. 1.

Figure 7:
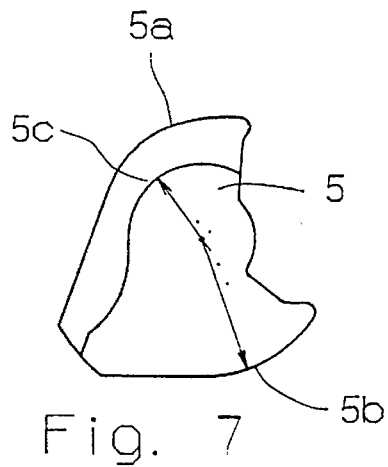
FIG. 7 is a plan view of a clamping member in axial direction.
Figure 8:
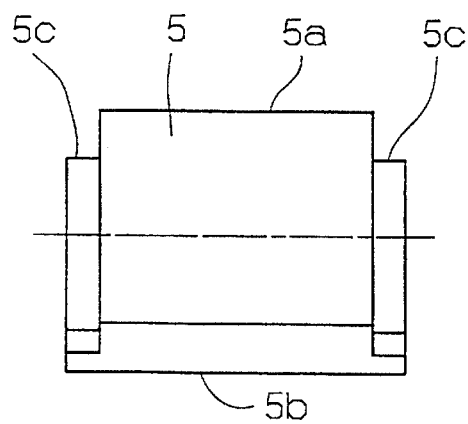
FIG. 8 is the same clamping member seen in the direction of rotation.

FIGS. 7 and 8 show finally the clamping member 5. Here it is essential that it requires merely two axially projecting shoulders 5c for its radial bracing against the stop surfaces 1a and 2a of the edge rings 1 and 2, which can be produced by simple lateral milling on the outer clamping surface. The contour of the shoulders 5c is so adjusted that the clamping member is capable of swivelling along the stop surfaces 1a and 2a in engaging and disengaging directions.

Figure 9:
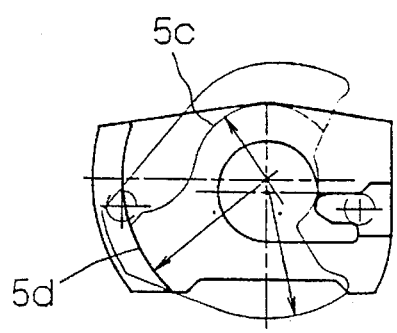
FIG. 9 is a clamping member mounted in a pocket according to an alternative form of construction.
Figures 10, 11:
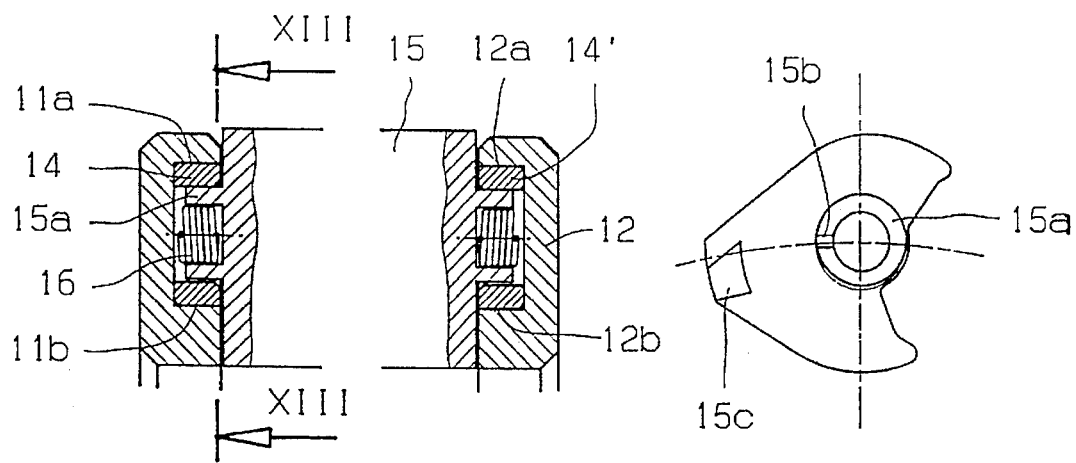
FIG. 10 is an alternative construction form for the pocket and the clamping member in a section along the line X—X in FIG. 13.
FIG. 11 is an axial side view of the clamping member from FIG. 10.
Figure 12:
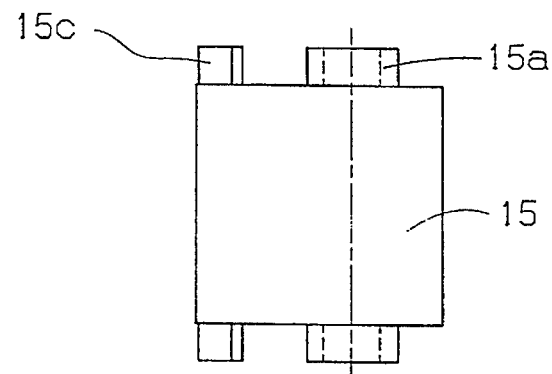
FIG. 12 is a radial plan view of the clamping member according to FIG. 11.
Figure 13:
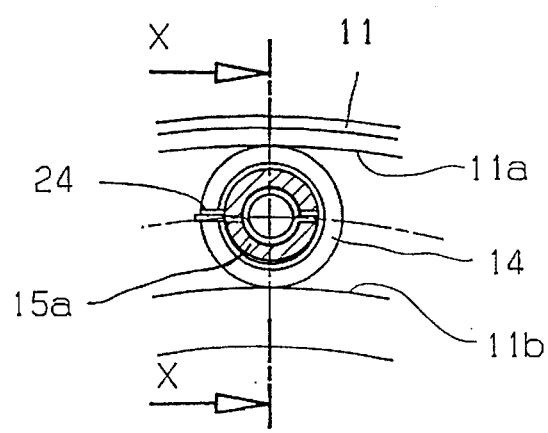
FIG. 13 is a section along the line XIII—XIII in FIG. 10.

FIG. 9 illustrates an alternative embodiment for the case where the clamping members are supposed to be as densely packed as possible in the circumferential direction in order to increase transmittable torque. The guidance of the clamping member along track curve 4a thereby no longer takes place on the outer contour of the clamping member, but along a shoulder 5d displaced in the direction toward the center of rotation of the clamping member, so that even the track curve 4a allocated to the pocket 4 can be further displaced inwardly, so that pocket 4 thus becomes shorter altogether in the circumferential direction.

FIGS. 10 to 14 depict an alternative embodiment, wherein the clamping member is braced not only in the circumferential direction, but also radially outwardly at the pockets, and the pockets themselves have a new form.

Here edge rings 11 are used which basically have the same construction as the previously described edge rings 1, in connection with which, however, the axially projecting ring-shaped stop faces 11a and 11b are arranged somewhat closer together. The pocket formed between these stop faces no longer has a pocket bottom, in contrast with the embodiment previously described, but rather consists only of a ring 14 which supports the clamping member 15 in the circumferential direction of the freewheel as well as radially. Dispensing with the pocket bottom has the advantage of a smaller construction width of the retainer ring while retaining the same bearing length of the clamping member.

The ring 14 need not be closed. It also need not have to present an exact circular form on either the inside or the outside. It is merely necessary that it corresponds outwardly with the stop faces 11a and 11b and assumes inwardly the guidance of the clamping member. In the interest of a more compact manner of construction, the clamping member is no longer guided along its outward contour or its shoulder, but rather has an axially projecting trunnion 15a on both end faces, the trunnions being mounted so that they can swivel at their outer periphery in the ring-shaped pocket 14 or 14'. The trunnions 15a are constructed as hollow cylinders so that they can receive springs 16 for acting in an engaging manner. These springs are braced with a leg in a groove 15b of the clamping member (see FIG. 11), with their other leg in a groove 24 of the ring-shaped pocket 14 (see FIG. 13).

The clamping members are also equipped on both their end faces with stops 15c for restricting the disengaging movement. Upon disengagement they end up in alignment with the outer stop face 11a.

The axial guidance of the clamping members takes place either through the edge rings or through the pockets, whereby one has the choice with the first embodiment of resorting to either the bottom plate or parts 4a and 4b for bracing.

Figure 14:
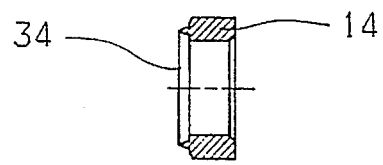
FIG. 14 is an axial section through the pocket according to FIG. 10 before its connection with the edge ring.

One recognizes in FIG. 14 that the ring-shaped pockets 14 have an axially projecting torus 34 at one of their end faces. This serves for welding of the pockets 14 with their corresponding edge ring 11. Also with this construction form there results the advantage that the costly parts, namely pockets and clamping members, remain the same for any desired freewheel widths and freewheel diameters.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A freewheel retainer ring comprising two opposite-facing ring-shaped edge rings (1, 2; 11, 12) extending substantially in a radial direction of the retainer ring, the rings being connected with each other by axial connecting bolts (3) thereby forming an axial interspace, the edge rings having between them a plurality of clamping members (5; 15) which are swivelably mounted in the retainer ring and are pretensioned by at least one spring (6; 16) in a direction of engagement of the retainer ring, whereby under action of centrifugal force the clamping members (5; 15) execute a swivel motion in a direction of disengagement and acting against the at least one spring, each clamping member including two axial extensions and opposite end faces, two separate pockets (4, 4'; 14, 14') being allocated to each clamping member (5; 15) at the axial extensions of each clamping member, the pockets engaging with the opposite end faces of the clamping member (5; 15) and guiding the clamping member at least in a circumferential direction of the retainer ring, and one of the two pockets (4; 14) being connected with one of the two edge rings (1; 11), and the other of the pockets (4'; 14') being connected with the opposite-facing edge ring (2, 12).

2. The freewheel retainer ring according to claim 1 wherein the edge rings (1, 2; 11, 12) have on their sides facing each other respectively at least one stop face (1a, 2a; 11a 12a) on which the pockets (4, 4'; 14, 14') are braced.

3. The freewheel retainer ring according to claim 2 wherein the at least one stop face (1a, 1b, 2a, 2b; 11a, 11b, 12a, 12b) on each edge ring (1, 2; 11, 12) is formed by a ring-shaped axial groove in the edge ring whose radial width is sufficient to receive a radial extension of the pockets (4, 4'; 14, 14').

4. The freewheel retainer ring according to claim 1, wherein the pockets (4, 4'; 14, 14') have a plurality of defined contact zones (14a, 14b, 14c) for precise fit positioning of the pockets on the edge rings (1, 2; 11, 12).

5. The freewheel retainer ring according to claim 1, wherein by the edge rings (1, 2) have at least one stop face (1a, 2a) on their sides turned toward each other on which the clamping bodies (5) are radially braced.

6. The freewheel retainer ring according to claim 5, wherein a radially inward-lying stop face (1b, 2b) is axially shorter than a radially outward-lying stop face (1a, 2a).

7. The freewheel retainer ring according to claim 1, wherein, the pockets (14) also brace the clamping members (15) in a radially outward direction.

8. The freewheel retainer ring according to claim 1, wherein the pockets (4) each comprise a pocket bottom arranged on an end face of the clamping member and at least one axially projecting guiding member (4a, 4b) which supports the clamping member front and back at least in the circumferential direction of the retainer ring.

9. The freewheel retainer ring according to claim 1, wherein each of the pockets (14) comprises an at least partially ring-shaped guiding member which supports the clamping member (15) front and back at least in the circumferential direction of the retainer ring.

10. The freewheel retainer ring according to claim 1, wherein the connection of the pockets (4, 4'; 14, 14') with the edge rings (1, 2; 11, 12) is formed only on an inside of the edge rings.

11. The freewheel retainer ring according to claim 1, wherein the pockets (4, 4'; 14, 14') are connected with the edge rings (1, 2; 11, 12) by welding.

12. The freewheel retainer ring according to claim 11, wherein the edge rings (1, 2; 11, 12) have welding bulges (4d; 34).

13. The freewheel retainer ring according to claim 11, wherein the pockets (4, 4'; 14, 14') have welding bulges (4d; 34).

14. The freewheel retainer ring according to claim 1, wherein the pockets (4, 4') are made of metal without cutting.

15. The freewheel retainer ring according to claim 14, wherein the pockets are made of one of bent sheet metal and die cast metal using a lost wax process.

16. The freewheel retainer ring according to claim 14, wherein the pockets are sintered parts.

17. The freewheel retainer ring according to claim 1, wherein each of the pockets (4, 4') has a recess (4c) on each of the end faces for receiving the spring (6).

18. The freewheel retainer ring according to claim 1, wherein by each pocket (4, 4'; 14, 14') has a stop face (24) for supporting a leg of the spring (6; 16).

19. The freewheel retainer ring according to claim 1, wherein pockets (4, 4'; 14, 14') standing opposite one another are constructed in a mirror image to each other.

* * * * *